(12) United States Patent
Zhang et al.

(10) Patent No.: US 11,023,273 B2
(45) Date of Patent: Jun. 1, 2021

(54) MULTI-THREADED PROGRAMMING

(71) Applicant: INTERNATIONAL BUSINESS MACHINES CORPORATION, Armonk, NY (US)

(72) Inventors: Yu Xuan Zhang, Shanghai (CN); Yuheng Zhang, Shanghai (CN); Jiu Fu Guo, Shanghai (CN); Zi Xuan Wu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/360,111

(22) Filed: Mar. 21, 2019

(65) Prior Publication Data

US 2020/0301733 A1  Sep. 24, 2020

(51) Int. Cl.
- *G06F 9/46* (2006.01)
- *G06F 9/48* (2006.01)
- *G06F 9/30* (2018.01)

(52) U.S. Cl.
CPC .......... *G06F 9/4843* (2013.01); *G06F 9/3001* (2013.01)

(58) Field of Classification Search
CPC ............................. G06F 9/4843; G06F 9/3001
See application file for complete search history.

(56) References Cited

U.S. PATENT DOCUMENTS

| | | | |
|---|---|---|---|
| 7,707,578 B1 | 4/2010 | Zedlewski et al. | |
| 7,765,547 B2 | 7/2010 | Cismas et al. | |
| 7,975,271 B2 | 7/2011 | Anderson | |
| 8,826,249 B2 | 9/2014 | Dice et al. | |
| 2012/0192168 A1* | 7/2012 | Funaoka | G06F 8/433 717/155 |
| 2015/0178132 A1 | 6/2015 | Cho et al. | |
| 2016/0140687 A1 | 5/2016 | Lefebvre et al. | |
| 2016/0162406 A1* | 6/2016 | Latorre | G06F 12/0815 711/122 |
| 2019/0311524 A1* | 10/2019 | Wang | G06T 7/564 |

OTHER PUBLICATIONS

Mell et al., "The NIST Definition of Cloud Computing", Recommendations of the National Institute of Standards and Technology, NIST Special Publication 800-145, Sep. 2011, 7 pages.

Cazorla et al., "Dynamically Controlled Resource Allocation in SMT Processors", Proceedings of the 37th International Symposium on Microarchitecture (Micro-37'04), 2004, 12 pages.

(Continued)

*Primary Examiner* — Tammy E Lee

(74) *Attorney, Agent, or Firm* — Anthony M. Pallone

(57) ABSTRACT

An embodiment of the invention may include a method, computer program product and system for multi-threaded programming. An embodiment may include creating a plurality of threads. Each of the plurality of threads implements a same functionality. An embodiment may include determining a first operation implementing the functionality using a first group of resources. An embodiment may include determining at least one second operation implementing the functionality using at least one second group of resources. An embodiment may include enabling each thread of the plurality of threads to call the first operation or the at least one second operation.

17 Claims, 5 Drawing Sheets

(56) References Cited

OTHER PUBLICATIONS

Dorai et al., "Transparent Threads: Resource Sharing in SMT Processors for High Single-Thread Performance", Proceedings of the International Conference on Parallel Architectures and Compilation Techniques, Sep. 25, 2002, pp. 1-26.

Mosely et al., "Methods for Modeling Resource Contention on Simultaneous Multithreading Processors", 2005 International Conference on Computer Design, Oct. 2-5, 2005, 8 pages.

Zhuravlev et al., "Addressing Shared Resource Contention in Multicore Processors via Scheduling", ASPLOS'10, Mar. 13-17, 2010, 13 pages.

\* cited by examiner

MULTI-THREADED PROGRAMMING

BACKGROUND

Embodiments of the present disclosure relates to software programming, and more specifically, to multi-threaded programming on simultaneous multithreading (SMT) architecture.

Multi-threaded programming allows a plurality of threads to share context and address space of a single process and to be executed independently. These threads are typically scheduled by an operating system. The multi-threaded programming relies on support provided by compilers and runtime libraries. A multi-threaded programming model leverages thread-level parallelism on a multi-core and multi-processor architecture.

Simultaneous multithreading is a hardware multithreading technique that is capable of executing instructions from the plurality of threads within one processor's clock cycle to improve instruction throughput of a single processor.

BRIEF SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present disclosure, there is provided a computer-implemented method for multi-threaded programming. In the method, a plurality of threads may be created. Each of the plurality of threads implements a same functionality. Then, a first operation may be determined to implement the functionality using a first group of resources, and at least one second operation may be determined to implement the functionality using at least one second group of resources. Moreover, each thread of the plurality of threads may be enabled to call the first operation or the at least one second operation.

According to another embodiment of the present disclosure, there is provided a computer system for multi-threaded programming. The apparatus may comprise one or more processors, a memory coupled to at least one of the processors, and a set of computer program instructions stored in the memory. The set of computer program instructions may be executed by at least one of the processors to perform the above method.

According to a third aspect of the present disclosure, there is provided a computer program product for multi-threaded programming. The computer program product may comprise a computer readable storage medium having program instructions embodied therewith. The program instructions executable by a processor cause the processor to perform the above method.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
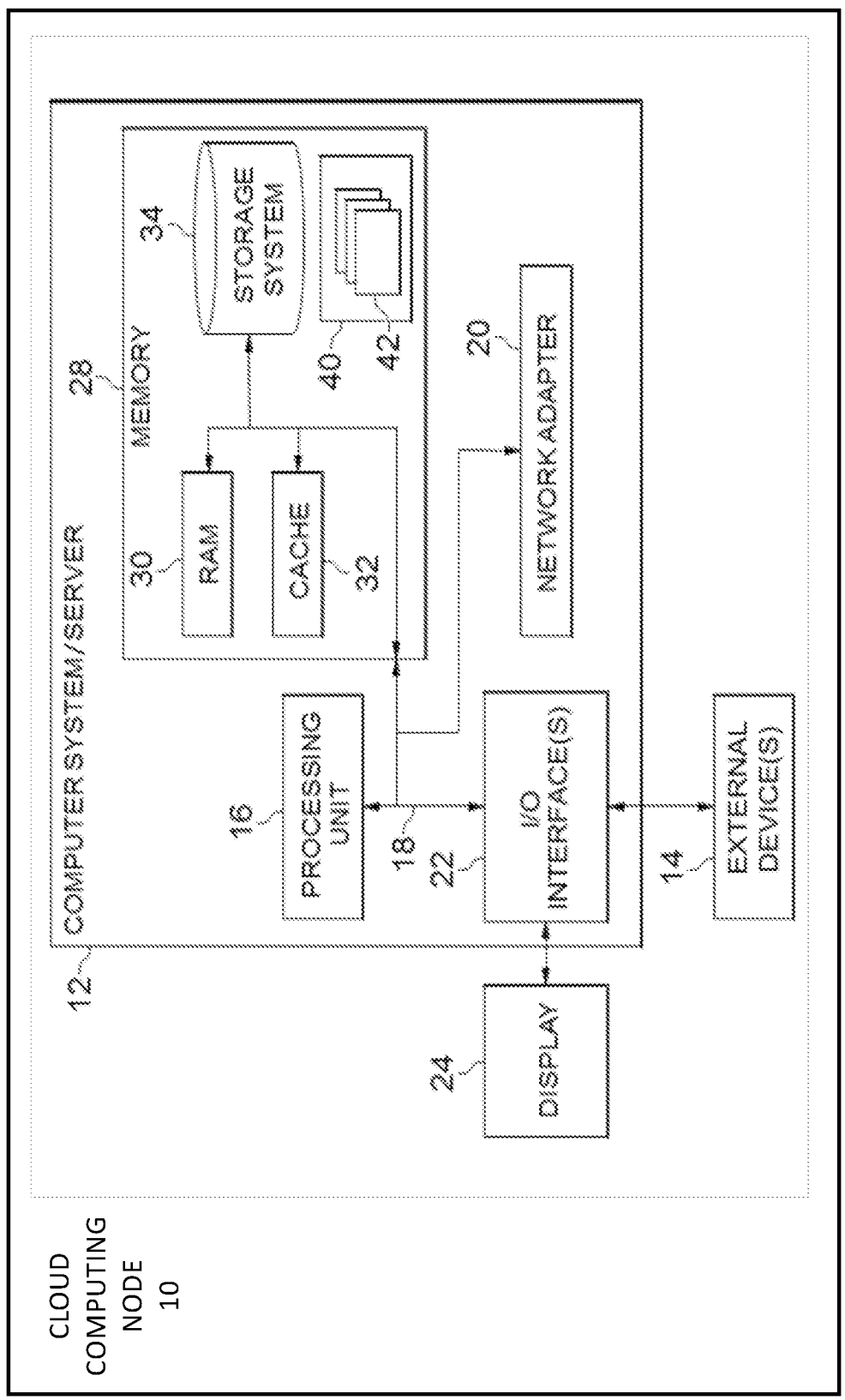
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
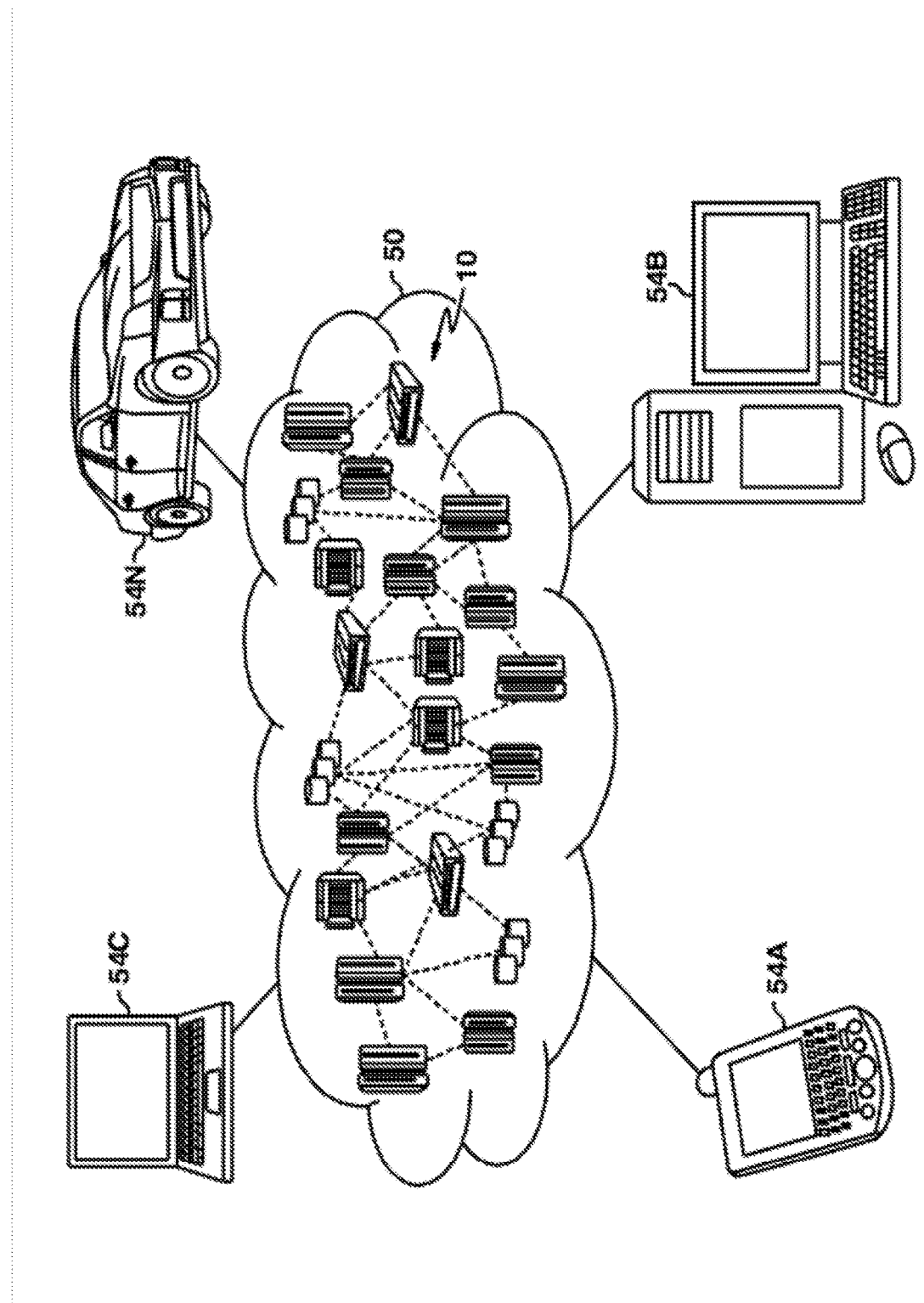
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
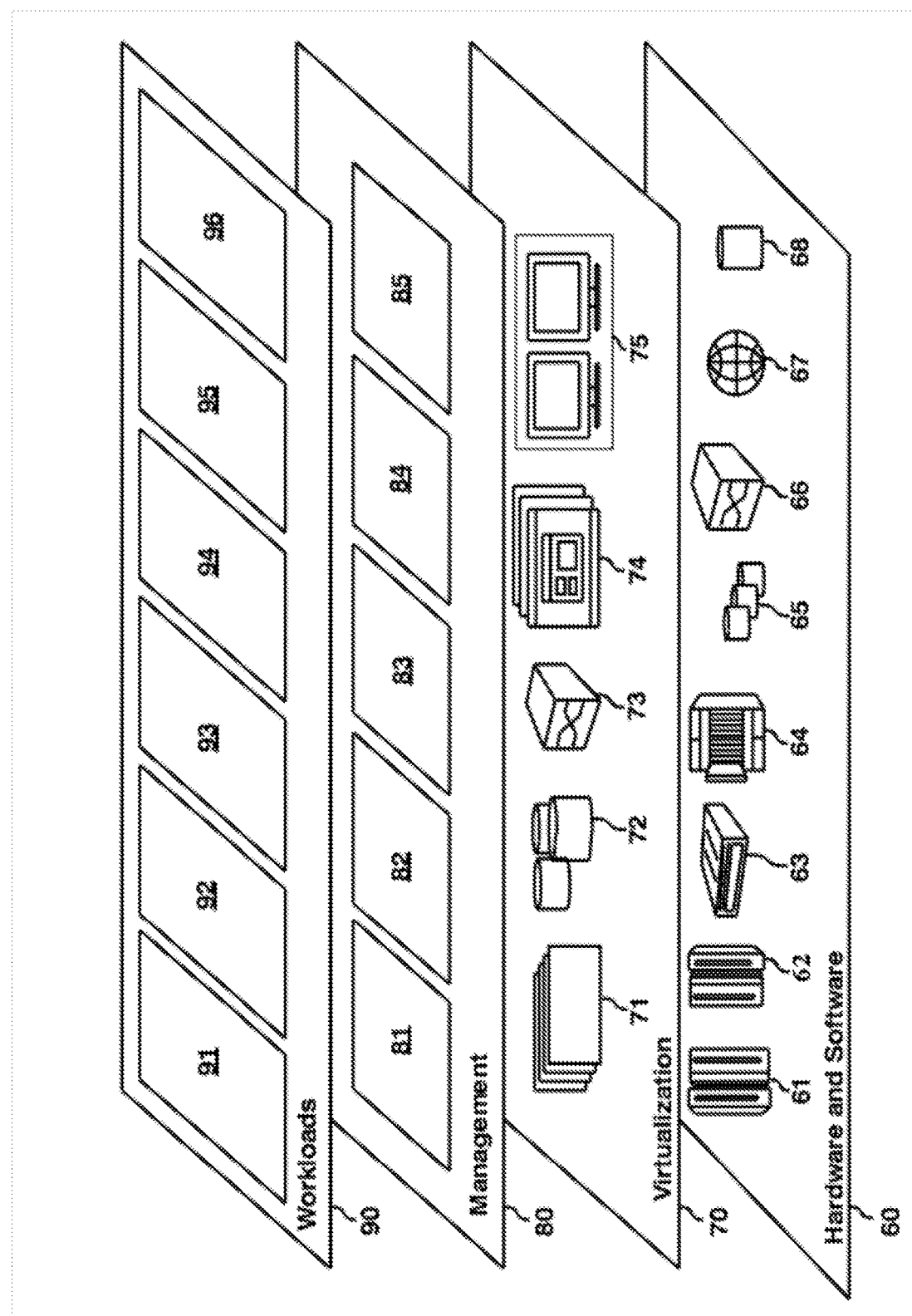
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-threaded programming 96.

In a processing system, a processor, such as a central processing unit (CPU), may perform a procedure to implement a task. The task generally contains a plurality of functionalities.

In a program, a plurality of threads may be created, and each of the plurality of threads may implement the same functionality. The plurality of threads can share resources of the processor. Generally, the resources may comprise an arithmetic resource, a memory space, a storage, a cache space, and a network resource or the like. Therefore, a performance of the multi-threaded programming highly depends on the shared resources among the threads.

In a case where a large number of threads attempt to use a same shared resource, a contention for the resource among the threads may occur intensively. The contention for the resource may lower efficiency of the program. Meanwhile, some other resources may be wasted due to idleness. The inventors of this invention found that the idle resources could be used to reduce the contention for the resource, thereby increasing utilization of resources and improving instruction throughput.

Specifically, the contention for the resource may involve an intra-thread contention and an inter-thread contention for the above mentioned resources. It is to be noted that, among the above kinds of resource contentions, embodiments of the present disclosure mainly focus on the inter-thread contention.

Embodiments of the present disclosure provide a method for multi-threaded programming based on the simultaneous multithreading architecture.

Figure 4:
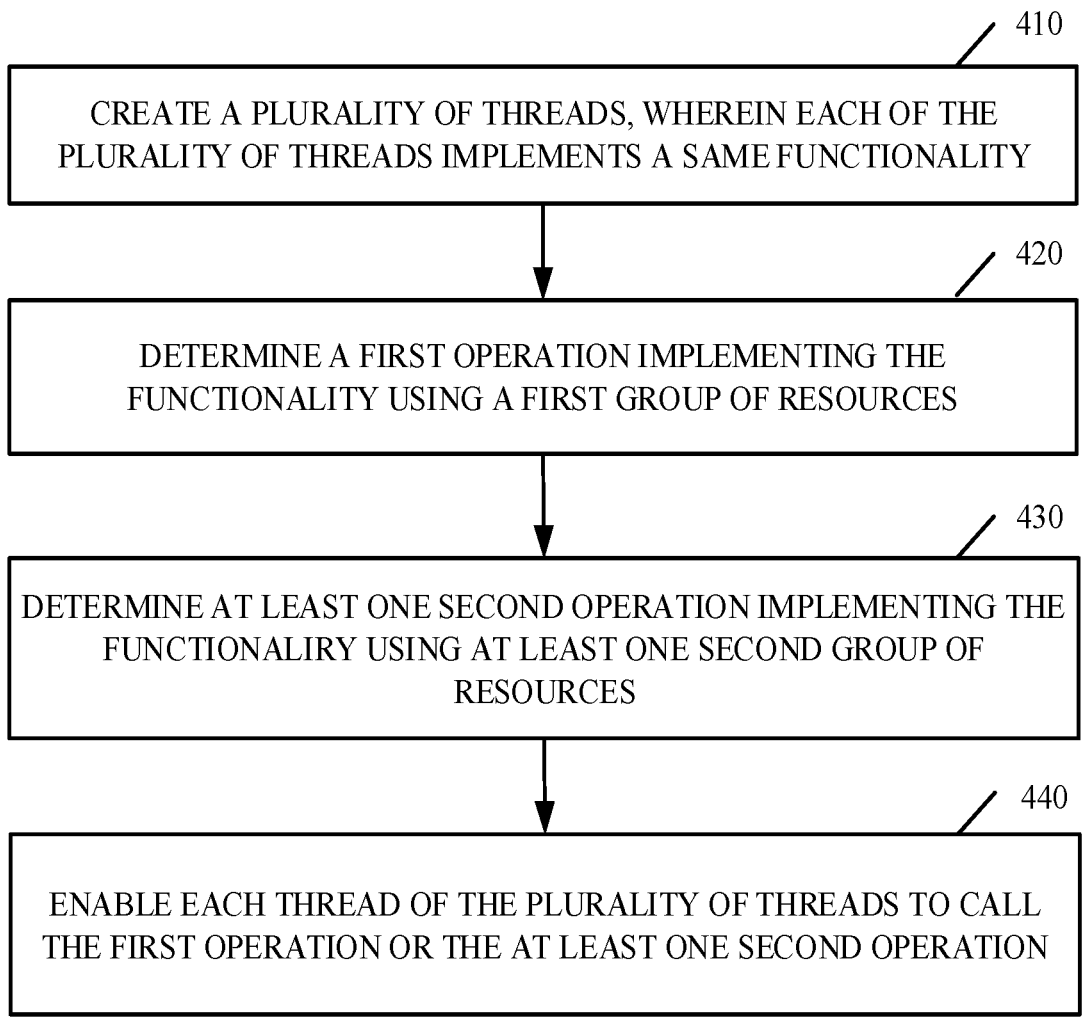
FIG. 4 depicts a schematic flowchart of a method for multi-threaded programming according to an embodiment of the present disclosure.

With reference now to FIG. 4, it shows a schematic flowchart of a method for multi-threaded programming on simultaneous multithreading architecture according to an embodiment of the present disclosure. The embodiment will be described in detail below in conjunction with the figures.

It should be noted that the processing of the multi-threaded programming according to embodiments of this disclosure could be implemented by a computing device, for example, the computer system/server 12 shown in FIG. 1.

As shown in FIG. 4, at block 410, the computing device creates a plurality of threads to implement a same functionality.

The functionality may be any one of an arithmetic functionality, a memory/storage allocation functionality, a memory/storage access functionality, a network related functionality, and the like. The embodiments can be described below by taking the arithmetic functionality as an example. The arithmetic functionality can be any one of following functionalities: an addition function, a subtraction function, a multiplication function, a division function, a reciprocal function, a square root function, and the like.

In some embodiments, the computing device may create the plurality of threads by using a programming model for thread-level parallelism, such as OpenMP model, POSIX pthread model, or the like. For example, based on the OpenMP model, the computing device may add a dedicated pragma to a source code. Then, the plurality of threads can be created in parallel. Following shows two examples based on the OpenMP model.

Example 1

```
#pragma omp parallel for
for (int i = 0; i < N; i++) {
  a[i] = sqrt(b[i]);
}
```

In Example 1, the source code describes a square root function executed N cycles. After adding the pragma, N threads can be created to implement the square root function respectively.

Example 2

```
#pragma omp parallel for
for (int i = 0; i < N; i++) {
  a[i] = a[i] / b[i];
}
```

In Example 2, the source code describes a division function executed N cycles. After adding the pragma, N threads can be created to implement the division function respectively.

Then, at block 420, the computing device determines a first operation. The first operation implements the functionality using a first group of resources.

The first operation may comprise at least one of following: an arithmetic operation, a memory/storage allocation operation, a memory/storage access operation, a cache read operation, a logic operation, a network interface allocation operation, a network protocol application operation, a network access operation and the like. In the embodiments of implementing the arithmetic functionality, the first operation can be an arithmetic operation. The arithmetic operation, for example, may comprise at least one of following: an integer/float point/vector addition operation, an integer/float point/vector subtraction operation, an integer/float point/vector multiplication operation, an integer/float point/vector division operation, a float point reciprocal operation, a float point/vector square root operation, and the like.

Moreover, the first group of resources may comprise at least one of following: an arithmetic resource, a memory space, a storage, a cache space, and a network resource and the like. In some embodiments, the resources used by the arithmetic operation, referred to as the arithmetic resource, may comprise an arithmetic logic unit (ALU), a float point unit (FPU), a vector unit, or other functional units. In an embodiment, the arithmetic logic unit may include but not limited to an integer adder, an integer subtractor, an integer multiplier, and an integer divider. The float point unit may include but not limited to a float point adder, a float point subtractor, a float point multiplier, a float point divider, a float point reciprocator, and a float point square root unit. Moreover, the vector unit may include but not limited to a vector adder, a vector subtractor, a vector multiplier, a vector divider, and a vector square root unit.

For the above Example 1, the computing device may determine that the square root function can be implemented by a float point square root operation using a float point square root unit. In this case, the first operation is the float point square root operation, and the first group of resources comprises the float point square root unit.

As the number of the float point square root units in the processor is limited, if each of the N threads calls the float point square root operation, the float point square root units would be very busy while other functional units would be idle. Therefore, there exists the contention for the float point square root units among the N threads.

On the other side, in the above Example 2, the computing device may determine that the division function can be implemented by a float point division operation using a float point divider. In this case, the first operation is the float point division operation, and the first group of resources comprises the float point divider.

With the limited number of the float point dividers, if each of the N threads calls the float point division operation, the float point dividers would be very busy. Therefore, the contention for the resources occurs intensely.

For reducing the contention for the resources, the computing device may determine at least one equivalent operation of the first operation. The at least one equivalent operation, as described below, may use a different group of resources to implement the same functionality.

At block 430, the computing device determines at least one second operation. The at least one second operation can implement the same functionality using at least one second group of resources.

As discussed above, the second operation may also comprise any one of an arithmetic operation, a memory/storage allocation operation, a memory/storage access operation, a cache read operation, a logic operation, a network interface allocation operation, a network protocol application operation, a network access operation and the like. For implementing the arithmetic functionality, the second operation can also be the arithmetic operation as described above.

Moreover, the second group of resources may also comprise at least one of the followings: an arithmetic resource, a memory space, a storage, a cache space, and a network resource and the like. As the second operation is the arithmetic operation, the resources used by the second operation may also comprise the above described arithmetic resources.

Generally, the second operation can be determined with general algorithms, such as software expansion and reassociation. The equivalent relationship between the first operation and the second operation can be saved in the memory or storage. Moreover, the computing device may establish an equivalent relationship model based on the saved equivalent relationship. The equivalent relationship model can then be trained based on simulation tests. Furthermore, the computing device may determine the second operation based on the first operation and the equivalent relationship model.

In the above Example 1, the computing device may determine that the square root function can also be implemented by a vector square root operation using a vector square root unit. Therefore, the second operation may be the vector square root operation, and the second group of resources may comprise the vector square root unit.

Moreover, in the above Example 2, the computing device may determine that the division function can also be implemented by a float point reciprocal operation in combination with a multiply operation, which can be expressed as a/b=a* (1/b). Therefore, in this case, the second operation may comprise the float point reciprocal operation and the multiply operation, and the second group of resources may comprise the float point reciprocator and the float point multiplier.

It is to be noted that the computing device may determine a plurality of second operations implementing the same functionality using different group of resources. For example, for the addition function, the computing device may determine an integer addition operation using an integer adder as the first operation, and determine a float point addition operation using a float point adder and a vector addition operation using a vector adder as the second operations respectively.

Then, as shown in FIG. 4, at block 440, the computing device enables each thread of the plurality of threads to call the first operation or the at least one second operation.

In some embodiments, the computing device may monitor utilization of the resources in real time and determine whether each idle resource belongs to the first group of resources or the at least one second group of resources. Then, the computing device may determine whether idle resources satisfy a requirement of calling the first operation or calling the at least one second operation. The requirement can be configured with respect to certain operating environments. When idle resources belonging to the first group of resources satisfy the requirement of calling the first operation, the computing device may enable a thread of the plurality of threads to call the first operation. Moreover, when the idle resources belonging to the first group of resources do not satisfy the requirement of calling the first operation and idle resources belonging to the at least one second group of resources satisfy a requirement of calling the at least one second operation, the computing device may enable the thread to call the at least one second operation. For the above Example 1, in a case where the processor comprises 1 float square root unit and 2 vector square root units, the thread being executed prefers to call the float point square root operation, while in a case where the processor comprises no float square root unit and 2 vector square root units, the thread being executed prefers to call the vector square root operation. In addition, if idle resources do not satisfy the requirement of calling either the first operation or the at least one second operation, the computing device may enable the thread to wait for resources released by other threads.

Furthermore, the number of resources in the respective group of resources may affect the performance of the multi-threaded programming. In some embodiments, the computing device may compare the number of resources in the first group of resources with the number of resources in the at least one second group of resources, and perform the enabling process based on the comparison result. In some embodiments, the computing device may enable the thread of the plurality of threads to call the first operation if the number of resources in the first group of resources is no more than the number of resources in the at least one second group of resources and the idle resources belonging to the first group of resources satisfy the requirement of calling the first operation. Moreover, the computing device may enable the thread to call the at least one second operation if the number of resources in the first group of resources is more than the number of resources in the at least one second group of resources and the idle resources belonging to the at least one second group of resources satisfy the requirement of calling the at least one second operation. For the above Example 1, assume that the number of resources of the first operation (float point square root operation) is 1 (a float square root unit) and the number of resources of a second operation (vector square root operation) is also 1 (a vector square root unit). In a case where the processor comprises 1 float square root unit and 2 vector square root units, the thread being executed prefers to call the float point square root operation, while in a case where the processor comprises no float square root unit and 2 vector square root units, the thread being executed prefers to call the vector square root operation. In addition, if the idle resources do not satisfy the requirement of calling either the first operation or the at least one second operation, the computing device may enable the thread to wait for resources released by other threads.

Moreover, running time of the respective operations may also affect the performance of the multi-threaded programming. In some embodiments, the computing device may compare the running time of the first operation with the running time of the at least one second operation. The computing device may enable a thread of the plurality of threads to call the first operation if the running time of the first operation is shorter than the running time of the at least one second operation and the idle resources belonging to the first group of resources satisfy a requirement of calling the first operation. Moreover, the computing device may enable the thread of the plurality of threads to call the at least one second operation if the running time of the first operation is not shorter than the running time of the at least one second operation and the idle resources belonging to the at least one second group of resources satisfy the requirement of calling the at least one second operation. For the above Example 1, assume that the running time of resources of the first operation (float point square root operation) is M, and the running time of resources of a second operation (vector square root operation) is N and M<N. In a case where the processor comprises 1 float square root unit and 2 vector square root units, the thread being executed prefers to call the float point square root operation, while in a case that the processor comprises no float square root unit and 2 vector square root units, the thread being executed prefers to call the vector square root operation. In addition, if the idle resources do not satisfy the requirement of calling either the first operation or the at least one second operation, the computing device may enable the thread to wait for resources released by other threads.

In addition, accuracy of the respective operations may also affect the performance of the multi-threaded programming. In some embodiments, the computing device may compare operational accuracy of the first operation with operational accuracy of the at least one second operation if the first operation and the at least one second operation are arithmetic operations. The computing device may enable a thread of the plurality of threads to call the first operation if the operational accuracy of the first operation is more accurate than the operational accuracy of the at least one second operation and the idle resources belonging to the first group of resources satisfy a requirement of calling the first operation. Moreover, the computing device may enable the thread of the plurality of threads to call the at least one second operation if the operational accuracy of the first operation is not more accurate than the operational accuracy of the at least one second operation and the idle resources belonging to the at least one second group of resources satisfy the requirement of calling the at least one second operation. In addition, if the idle resources do not satisfy the requirement of calling either the first operation or the at least one second operation, the computing device may enable the thread to wait for resources released by other threads.

In some embodiments, the operational accuracy can be represented by an integer, float point, vector, or the like. Generally, the vector is more accurate than the float point, and the float point is more accurate than the integer. For example, in a case where the operational accuracy of the first operation is a 16-bits integer and the operational accuracy of the at least one second operation is a 32-bits integer, float point or vector, the computing device may enable the thread to call the at least one second operation if the idle resources belonging to the at least one second group of resources satisfy the requirement of calling the at least one second operation.

Moreover, the computing device may also perform the enabling process based on a combination of the number of resources in the respective group of resources, the running time of the respective operations, and the operational accuracy of the respective operations.

As the same functionality may be implemented by calling any one of a plurality of threads, while the plurality of threads may call different operations which use different resources to reduce the contention for the resource, the utilization of the resources of the processor can be increased, and the throughput of the processor can also be improved.

Figure 5:
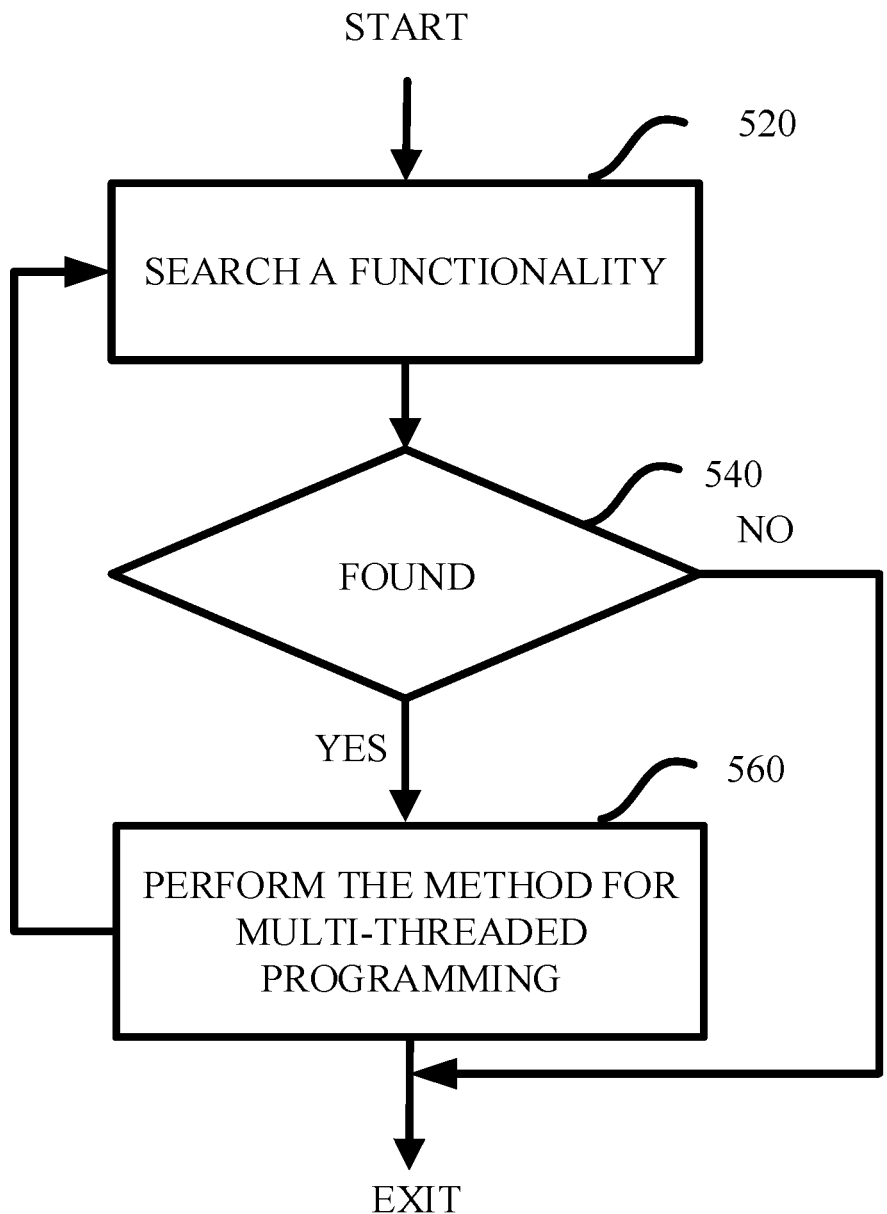
FIG. 5 depicts a schematic flowchart illustrating an example for multi-threaded programming in which the method shown in FIG. 4 is implemented.

FIG. 5 shows a schematic flowchart of an example for illustrating multi-threaded programming in which the method shown in FIG. 4 is implemented.

As described above, a procedure contains a plurality of functionalities. As shown in FIG. 5, at block 520, the computing device may begin by searching one of the functionalities in the procedure.

If a functionality is found at block 540, the computing device may perform the method for multi-threaded programming according to the embodiments of the disclosure at block 560. With respect to FIG. 4, the computing device may create a plurality of threads for the found functionality. Then, the computing device may determine a first operation implementing the functionality using a first group of resources, and determine at least one second operation implementing the functionality using at least one second group of resources. Moreover, the computing device may enable each thread to call the first operation or the at least one second operation.

Then, the computing device may go back to block 520 and iteratively search a next functionality, until all of the functionalities have been found in the procedure.

Additionally, in some embodiments of the disclosure, an apparatus for multi-threaded programming can be provided. The apparatus may comprise one or more processors, a memory coupled to at least one of the processors, and a set of computer program instructions stored in the memory. The set of computer program instructions may be executed by at least one of the processors to implement the methods shown in FIG. 4. In the method, a plurality of threads may be created, wherein each of the plurality of threads implements a same functionality. Then, a first operation may be determined to implement the functionality using a first group of resources, and at least one second operation may be determined to implement the functionality using at least one second group of resources. Moreover, each thread of the plurality of threads may be enabled to call the first operation or the at least one second operation.

In some other embodiments of the disclosure, a computer program product for multi-threaded programming can be provided. The computer program product may comprise a computer readable storage medium having program instructions embodied therewith. The program instructions, when executed by a processor, cause the processor to implement the methods shown in FIG. 4. In the method, a plurality of threads may be created, wherein each of the plurality of threads implements a same functionality. Then, a first operation may be determined to implement the functionality using a first group of resources, and at least one second operation may be determined to implement the functionality using at least one second group of resources. Moreover, each thread of the plurality of threads may be enabled to call the first operation or the at least one second operation.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multi-threaded programming, the method comprising:
   creating, by one or more processors, a plurality of threads, wherein each of the plurality of threads implements a same functionality;
   determining, by the one or more processors, a first operation implementing the same functionality using a first group of resources;
   determining, by the one or more processors, at least one second operation implementing the same functionality using at least one second group of resources; and
   enabling, by the one or more processors, each thread of the plurality of threads to call the first operation or the at least one second operation,
   wherein the enabling each thread of the plurality of threads to call the first operation or the at least one second operation further comprises:
   enabling, by the one or more processors, a thread of the plurality of threads to call the first operation in response to a number of resources in the first group of resources being no more than a number of resources in each of the at least one second group of resources and idle resources belonging to the first group of resources satisfying a requirement of calling the first operation; and
   enabling, by the one or more processors, the thread of the plurality of threads to call the at least one second operation in response to the number of resources in the first group of resources being more than the number of resources in each of the at least one second group of resources and idle resources belonging to the at least one second group of resources satisfying a requirement of calling the at least one second operation.

2. The computer-implemented method of claim 1, wherein the enabling each thread of the plurality of threads to call the first operation or the at least one second operation further comprises:
   enabling, by the one or more processors, a thread of the plurality of threads to call the first operation in response to a running time of the first operation being shorter than a running time of each of the at least one second operation and idle resources belonging to the first group of resources satisfying a requirement of calling the first operation; and
   enabling, by the one or more processors, the thread of the plurality of threads to call the at least one second operation in response to the running time of the first operation being not shorter than the running time of each of the at least one second operation and idle resources belonging to the at least one second group of resources satisfying a requirement of calling the at least one second operation.

3. The computer-implemented method of claim 1, wherein the enabling each thread of the plurality of threads to call the first operation or the at least one second operation further comprises:
   enabling, by the one or more processors, a thread of the plurality of threads to call the first operation in response to idle resources belonging to the first group of resources satisfying a requirement of calling the first operation; and
   enabling, by the one or more processors, the thread of the plurality of threads to call the at least one second operation in response to the idle resources belonging to the first group of resources not satisfying the requirement of calling the first operation and idle resources belonging to the at least one second group of resources satisfying a requirement of calling the at least one second operation.

4. The computer-implemented method of claim 1, wherein the first operation and the at least one second operation comprise arithmetic operations, and resources used by the arithmetic operations comprise at least one of following resources selected from the group consisting of: an arithmetic logic unit, a float point unit and a vector unit.

5. The computer-implemented method of claim 4, wherein the enabling each thread of the plurality of threads to call the first operation or the at least one second operation further comprises:
   enabling, by the one or more processors, a thread of the plurality of threads to call the first operation in response to an operational accuracy of the first operation being more accurate than an operational accuracy of each of the at least one second operation and idle resources belonging to the first group of resources satisfying a requirement of calling the first operation; and
   enabling, by the one or more processors, the thread of the plurality of threads being executed to call the at least one second operation in response to the operational accuracy of the first operation being no more accurate than the operational accuracy of each of the at least one second operation and idle resources belonging to the at least one second group of resources satisfying a requirement of calling the at least one second operation.

6. The computer-implemented method of claim 1, wherein the creating a plurality of threads further comprises:
   creating, by one or more processors, a plurality of threads with OpenMP model or POSIX Threads model.

7. The computer-implemented method of claim 1, wherein the first group of resources and the at least one second group of resources comprise at least one of following resources selected from the group consisting of: an arithmetic resource, a memory space, a storage, a cache space, and a network resource.

8. A computer system for multi-threaded programming, the computer system comprising:
   one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
      program instructions to create a plurality of threads, wherein each of the plurality of threads implements a same functionality;
         program instructions to determine a first operation implementing the same functionality using a first group of resources;
         program instructions to determine at least one second operation implementing the same functionality using at least one second group of resources; and
      program instructions to enable each thread of the plurality of threads to call the first operation or the at least one second operation;
      wherein the program instructions to enable each thread of the plurality of threads to call the first operation or the at least one second operation further comprises:
      program instructions to enable a thread of the plurality of threads to call the first operation in response to a number of resources in the first group of resources being no more than a number of resources in each of the at least one second group of resources and idle resources belonging to the first group of resources satisfying a requirement of calling the first operation; and
      program instructions to enable the thread of the plurality of threads to call the at least one second operation in response to the number of resources in the first group of resources being more than the number of resources in each of the at least one second group of resources and idle resources belonging to the at least one second group of resources satisfying a requirement of the at least one second operation.

9. The computer system of claim 8, wherein the program instructions to enable each thread of the plurality of threads to call the first operation or the at least one second operation further comprises:
   program instructions to enable a thread of the plurality of threads to call the first operation in response to a running time of the first operation being shorter than a running time of each of the at least one second operation and idle resources belonging to the first group of resources satisfying a requirement of calling the first operation; and
   program instructions to enable the thread of the plurality of threads to call the at least one second operation in response to the running time of the first operation being not shorter than the running time of each of the at least one second operation and idle resources belonging to the at least one second group of resources satisfying a requirement of calling the at least one second operation.

10. The computer system of claim 8, wherein the program instructions to enable each thread of the plurality of threads to call the first operation or the at least one second operation further comprises:
   program instructions to enable a thread of the plurality of threads to call the first operation in response to idle resources belonging to the first group of resources satisfying a requirement of calling the first operation; and
   program instructions to enable the thread of the plurality of threads to call the at least one second operation in response to the idle resources belonging to the first group of resources not satisfying the requirement of calling the first operation and idle resources belonging to the at least one second group of resources satisfying a requirement of calling the at least one second operation.

11. The computer system of claim 8, wherein the first operation and the at least one second operation comprise arithmetic operations, and resources used by the arithmetic operations comprise at least one of following resources selected from the group consisting of: an arithmetic logic unit, a float point unit and a vector unit.

12. The computer system of claim 11, wherein the program instructions to enable each thread of the plurality of threads to call the first operation or the at least one second operation further comprises:
   program instructions to enable a thread of the plurality of threads to call the first operation in response to an operational accuracy of the first operation being more accurate than an operational accuracy of each of the at least one second operation and idle resources belonging to the first group of resources satisfying a requirement of calling the first operation; and
   program instructions to enable the thread of the plurality of threads to call the at least one second operation in response to the operational accuracy of the first operation being no more accurate than the operational accuracy of each of the at least one second operation and idle resources belonging to the at least one second group of resources satisfying a requirement of calling the at least one second operation.

13. A computer program product for multi-threaded programming, the computer program product comprising:
   one or more non-transitory computer-readable tangible storage devices and program instructions stored on at least one of the one or more computer-readable tangible storage devices, the program instructions comprising:
      program instructions to create a plurality of threads, wherein each of the plurality of threads implements a same functionality;
      program instructions to determine a first operation implementing the same functionality using a first group of resources;
      program instructions to determine at least one second operation implementing the same functionality using at least one second group of resources; and
      program instructions to enable each thread of the plurality of threads to call the first operation or the at least one second operation,
   wherein the program instructions to enable each thread of the plurality of threads to call the first operation or the at least one second operation further comprises:
      program instructions to enable a thread of the plurality of threads to call the first operation in response to a number of resources in the first group of resources being no more than a number of resources in each of the at least one second group of resources and idle resources belonging to the first group of resources satisfying a requirement of calling the first operation; and
      program instructions to enable the thread of the plurality of threads to call the at least one second operation in response to the number of resources in the first group of resources being more than the number of resources in each of the at least one second group of resources and idle resources belonging to the at least one second group of resources satisfying a requirement of calling the at least one second operation.

14. The computer program product of claim 13, wherein the program instructions to enable each thread of the plurality of threads to call the first operation or the at least one second operation further comprises:
   program instructions to enable a thread of the plurality of threads to call the first operation in response to a running time of the first operation being shorter than a running time of each of the at least one second operation and idle resources belonging to the first group of resources satisfying a requirement of calling the first operation; and
   program instructions to enable the thread of the plurality of threads to call the at least one second operation in response to the running time of the first operation being not shorter than the running time of each of the at least one second operation and idle resources belonging to the at least one second group of resources satisfying a requirement of calling the at least one second operation.

15. The computer program product of claim 13, wherein the program instructions to enable each thread of the plurality of threads to call the first operation or the at least one second operation further comprises:
   program instructions to enable a thread of the plurality of threads to call the first operation in response to idle resources belonging to the first group of resources satisfying a requirement of calling the first operation; and
   program instructions to enable the thread of the plurality of threads to call the at least one second operation in response to the idle resources belonging to the first group of resources not satisfying the requirement of calling the first operation and idle resources belonging to the at least one second group of resources satisfying a requirement of calling the at least one second operation.

16. The computer program product of claim 13, wherein the first operation and the at least one second operation comprise arithmetic operations, and resources used by the arithmetic operations comprise at least one of following resources selected from the group consisting of: an arithmetic logic unit, a float point unit and a vector unit.

17. The computer program product of claim 16, wherein the program instructions to enable each thread of the plurality of threads to call the first operation or the at least one second operation further comprises:
   program instructions to enable a thread of the plurality of threads to call the first operation in response to an operational accuracy of the first operation being more accurate than an operational accuracy of each of the at least one second operation and idle resources belonging to the first group of resources satisfying a requirement of calling the first operation; and program instructions to enable the thread of the plurality of threads to call the at least one second operation in response to the operational accuracy of the first operation being no more accurate than any of the operational accuracy of the at least one second operation and idle resources belonging to the at least one second group of resources satisfying a requirement of calling the at least one second operation.

* * * * *